Oct. 21, 1930. R. LIEBERT 1,779,398
RUDDER COMPENSATING DEVICE
Filed Jan. 12, 1926 3 Sheets-Sheet 1

Inventor
Richard Liebert.

Attorney

Oct. 21, 1930.                R. LIEBERT                1,779,398
                     RUDDER COMPENSATING DEVICE
                  Filed Jan. 12, 1926      3 Sheets-Sheet 2

Inventor
Richard Liebert
O.E.Bee.
By
                                                    Attorney Oct. 21, 1930.   R. LIEBERT   1,779,398
RUDDER COMPENSATING DEVICE
Filed Jan. 12, 1926   3 Sheets-Sheet 3

Inventor
Richard Liebert.
By O.E.Bee.
Attorney

Patented Oct. 21, 1930

1,779,398

UNITED STATES PATENT OFFICE

RICHARD LIEBERT, OF AKRON, OHIO, ASSIGNOR TO GOODYEAR-ZEPPELIN CORPORATION, OF AKRON, OHIO, A CORPORATION OF DELAWARE

RUDDER-COMPENSATING DEVICE

Application filed January 12, 1926. Serial No. 80,725.

My invention relates to airships and it has particular relation to a novel type of steering apparatus which is peculiarly adapted to serve as rudders or elevators for various types of dirigible airships.

One object of my invention is to provide a steering apparatus which is so constructed that it is partially balanced for movement about a pivotal support and the moment of the main rudder or main elevator about the pivotal support is reduced relative to the entire moment, according to the degree of movement of certain elements of the apparatus away from the neutral position of the rudder mechanism as a whole.

Another object of my invention is to provide a steering apparatus including in its structure a number of aerofoils, some of which are provided with surfaces of variable contour, such variable surfaces being operable to compensate for the forces required to operate the entire mechanism.

Heretofore, in the construction of aircraft and marine craft, steering apparatus have been employed which were composed of main rudder members and auxiliary or compensating rudder members. The auxiliary or compensating rudder members served the purpose of facilitating operation of the entire apparatus, thereby relieving the pilot of considerable exertion.

My invention is directed to steering apparatus of the aforementioned general class, and it is particularly concerned with improvements of the parts of the mechanism comprising the compensating rudder members. With reference to the invention, as applied to aircraft it is well known that aerofoils, whether they be relatively thick or thin, are subjected to a high ratio of lift to drag, and to an especially high vertical component of air forces. This fundamental law of aerodynamics is practically applied to the development of the steering apparatus comprising my invention.

Generally the structure embodying my invention comprises a main rudder aerofoil, which is pivoted adjacent one edge to an aircraft fin, and is provided with rigid arms extending beyond the pivoted edge. Auxiliary aerofoils constructed of several articulated sections are pivoted at the ends of the rigid arms, and pivoted members connect the auxiliary aerofoils to the stabilizing fin. Thus when the rudder is operated the surfaces of the auxiliary aerofoils are adjusted or cambered in such manner that the ratio of air forces acting thereon is proportionately greater than the corresponding air forces acting upon the main rudder aerofoils. This construction and arrangement reduces the amount of force required to operate the steering apparatus.

For a better understanding of my invention reference may now be had to the accompanying drawings forming a part of this specification, of which;

Figure 1:
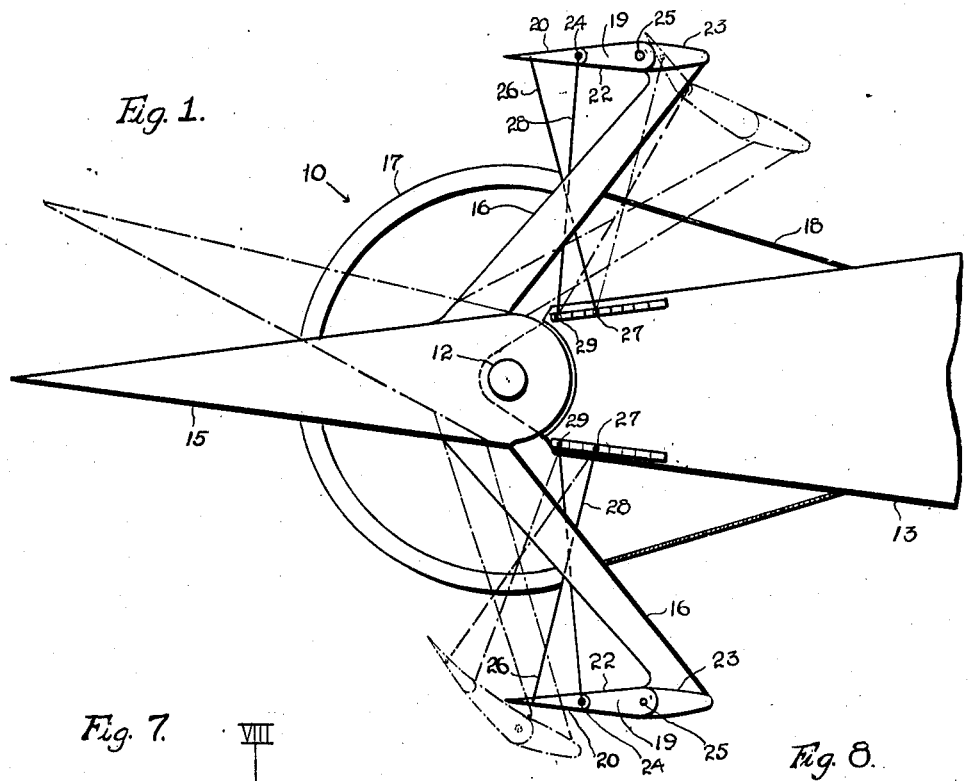
Fig. 1 is an elevational view of a steering apparatus embodying my invention, illustrated as being connected to an airship fin.
Figure 4:
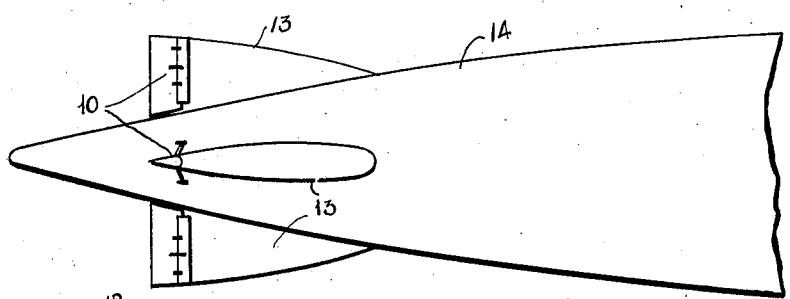
Fig. 4 is a fragmentary elevational view of one end of an airship, illustrating the manner in which an apparatus embodying my invention is applied thereto.

In practicing my invention, I provide a steering mechanism 10, which is adapted to serve either as a horizontal elevator or as a vertical rudder. As illustrated in Figs. 1 and 4, the steering mechanisms are hinged, as indicated at 12, to the rear end portions of stabilizing fins 13. These fins are secured to an aircraft super-structure 14 in a manner well known in the art.

Figure 6:
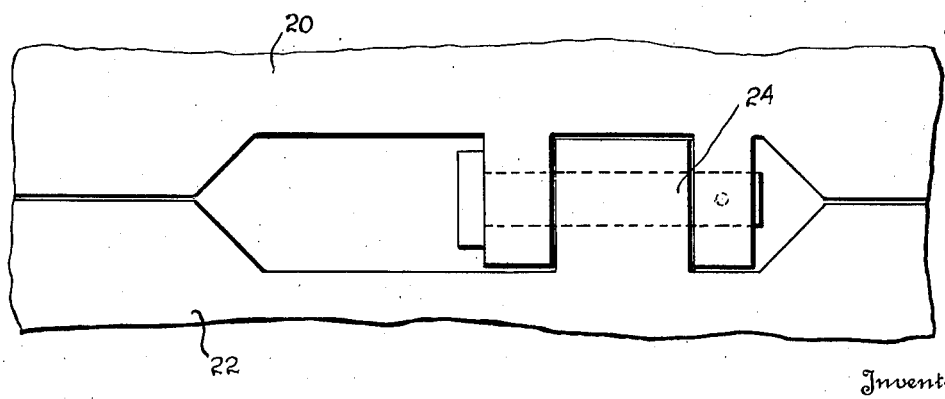
Fig. 6 is a fragmentary plan view illustrating a hinge connection employed in securing together sections of an auxiliary aerofoil embodied in my invention.

With reference to Fig. 1, the steering mechanism 10 comprises a main rudder member or aerofoil 15 provided with rigid forwardly projecting arms 16. The rudder member 15 rigidly supports a pulley 17, which is operated by a control cable 18 extending to the pilot car (not shown) of the airship. At the outer end of each arm 16, a sectional articulated compensating aerofoil or rudder member 19 is mounted, which is composed of sections 20, 22 and 23, the latter being rigidly secured to the outer end of the arm 16. These sections are secured together by means of hinge members 24 and 25, one of which is shown in detail in Fig. 6. Adjacent the rear or trailing edge of the section 20 one end of a rod 26 is pivotally secured thereto, and the other end of this rod is pivoted to the fin 13, as indicated at 27. Likewise, a rod 28 is pivoted at one end to the hinge connection 24, and at the other end to the fin, as indicated at 29.

Figure 7:
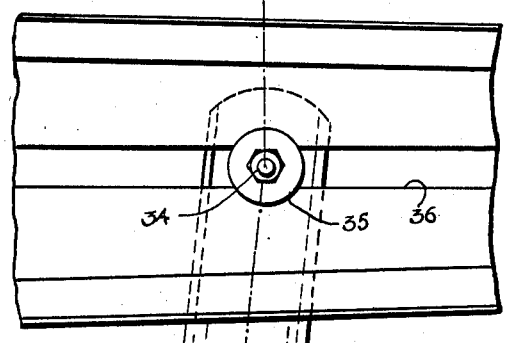
Fig. 7 is a fragmentary elevational view on an enlarged scale illustrating in detail a rod connection employed in securing together portions of the apparatus.
Figure 8:
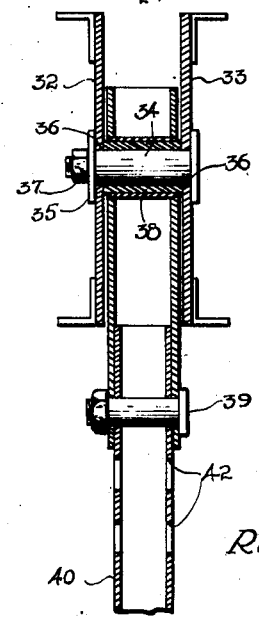
Fig. 8 is a cross-sectional view on an enlarged scale of the structure shown in Fig. 7, the view being taken substantially along the line VIII—VIII thereof.

As best shown in Figs. 7 and 8, the rod 26 at its connection 27 is provided with a hollow end portion 30, which is disposed between two sections 32 and 33 of the fin, and is held in proper position therebetween by means of a bolt 34 and washer 35. The bolt 34 is adapted to be adjusted horizontally within slots 36 provided in the sections 32 and 33, and is tightened against these sections by means of a nut 37 and a bushing 38. It is to be understood that each of the rods 26 and 28 is adjustable in the slots 36 in the same manner. Also, the length of the rod 26 may be adjusted by means of a bolt 39, which secures the end portion 30 of the rod to a relatively telescoping portion 40. A number of openings 42 are provided in the telescoping portion 40 for the purpose of receiving the adjusting bolt 39.

From this construction, it will be apparent that the surface contour of the auxiliary compensating aerofoils 19 will be cambered or varied when the rudder member 15 is turned in either direction from its neutral position. This operation is automatically effected by the rod connections 26 and 28 and the degree of camber or variation in the contour of the auxiliary aerofoils may be adjusted by changing the location of the fastening bolt 34 along the slot 36. Accordingly, the desired ratio of lift to drag may be obtained for the average position of the rudder 15 and the compensating moment likewise may be adapted to special conditions which follow from the use of any particular type of aircraft. The operation of the cambered aerofoil reduces the amount of work necessary to turn the rudder and at the same time it increases the rudder moment which turns the airship. As the rudder 10 is turned to the position indicated in dot and dash lines of Fig. 1, the angle of attack of the air forces acting thereon will be increased at a relatively greater rate upon the auxiliary aerofoils 10 than on the main rudder aerofoils 15. Accordingly, a relatively smaller rudder member 15 may be employed than was heretofore practical without loss of effectiveness in operation of the rudder. The weight and drag of the compensating aerofoils 19 do not cause any additional loss in efficiency of operation by reason of the reduction in size of the main rudder 15.

Figure 2:
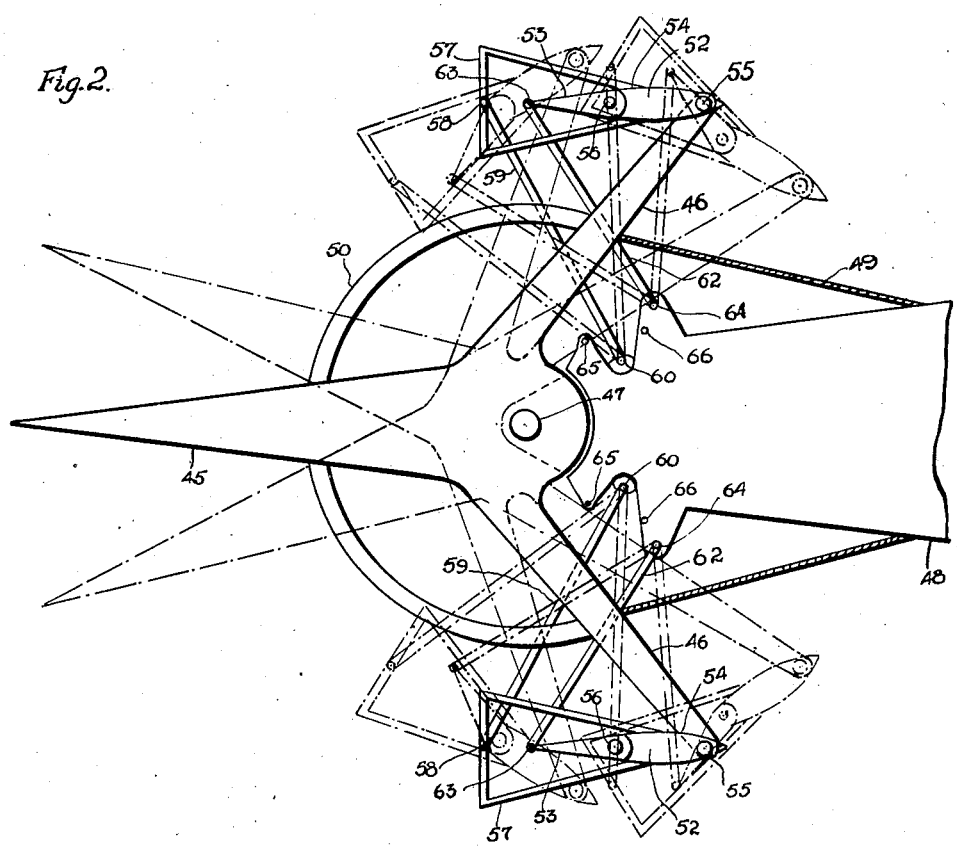
Fig. 2 is an elevational view similar to that shown in Fig. 1, illustrating another form which my invention may assume.

The embodiment of my invention, as shown in Fig. 2, operates in substantially the same manner as that just described. This figure illustrates a main rudder aerofoil 45 provided with forwardly extending arms 46 and a hinged connection 47 joining the rudder to a fin 48. A control cable 49 adapted to be operated from a pilot car (not shown) is disposed about a pulley 50 and serves to turn the rudder mechanism about the hinge 47.

At the outer end of each arm 46, an auxiliary aerofoil 52 is pivotally mounted, which is composed of a plurality of hinged sections 53 and 54, the section 54 being pivoted at 55 to the end of the arm 46 and the section 53 being pivoted at 56 to the section 54. A frame 57, rigidly secured to the section 54, extends beyond the trailing edge of the section 53, and is connected at 58 to one end of a rod 59, the other end of the latter being pivoted at 60 to the fin 48. Likewise, a second rod 62 is pivotally connected, as indicated at 63 to the trailing edge of the section 53, and is connected at its other end to a lug or projection 64, carried by the fin 48. Additional connecting openings 65 and 66 are provided on the fin in order that the rods 59 and 62 may be adjusted according to the degree of camber desired with respect to the aerofoils 52. It is to be understood that any desired number of these connecting points may be provided. The change in the surface contour of the aerofoils 52 is indicated in dot and dash lines of Fig. 2, and the effect upon the steering apparatus as a whole is substantially the same as that described with reference to Fig. 1.

Figure 3:
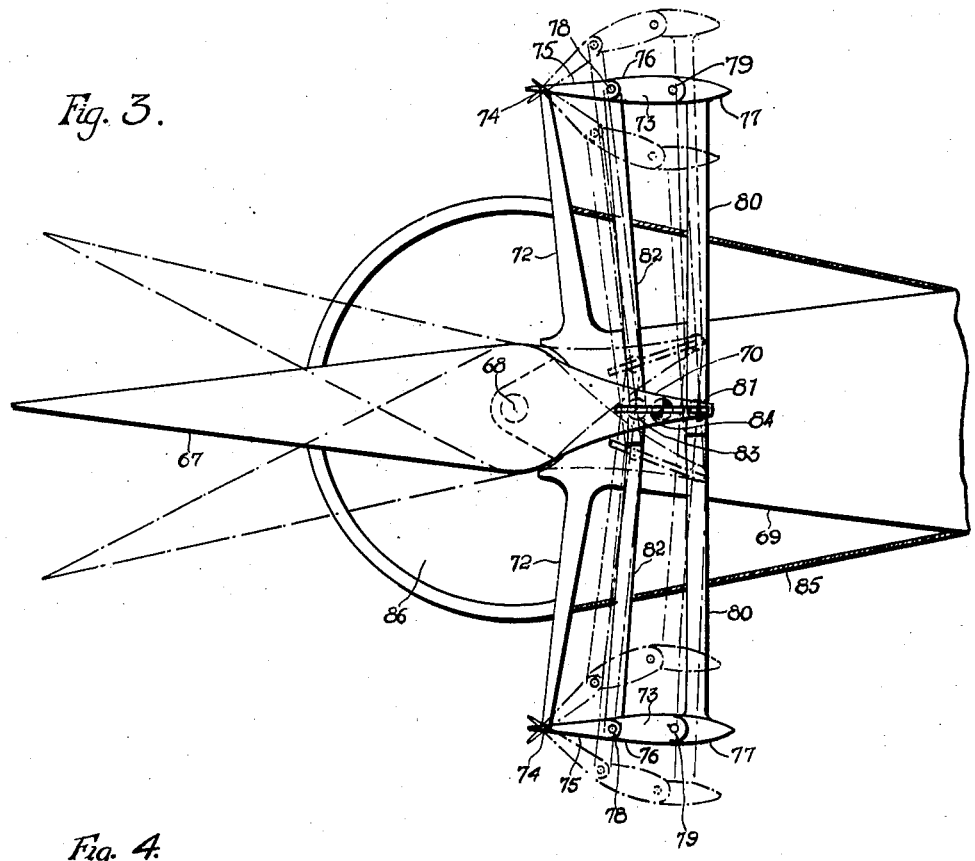
Fig. 3 is an elevational view similar to that shown in Fig. 1, illustrating another form which my invention may assume.

The structure disclosed in Fig. 3 differs from that described in the foregoing paragraphs in that the main rudder 67, hinged as indicated at 68 to a fin 69, is not provided with a pair of forwardly extending arms. Instead the rudder member 67 is provided with a forwardly projecting arm 70, which is in alignment with the fin 69 in its neutral position. In this embodiment of my invention, the fin 69 is provided with two rigid oppositely extending arms 72, which pivotally support auxiliary compensating aerofoils 73 adjacent the trailing edges of the latter, as indicated at 74. Each of the auxiliary aerofoils 73 is provided with a rear section 75 hinged to an intermediate section 76, the latter of which is in turn hinged to a forward section 77, the hinged connections being indicated at 78 and 79, respectively. Each of the forward sections 77 is provided with a rigid rod or bar 80, which is connected by means of an adjusting bolt 81 adjacent the end of the arm 70 of the main rudder member 67. Likewise, a rod 82 is pivoted to the hinge connection 78 between the sections 75 and 76, and is connected to the arm 70 by means of an adjusting bolt 83. The bolts 81 and 83 are adapted to be adjusted within a slot 84 provided in the arm 70, this adjustment being effected in substantially the same manner as the adjustment made and described with reference to the structure shown in Fig. 7.

By operating the control cable 85 and pulley 86 in opposite directions, the mechanism will assume the positions indicated in dot and dash lines, and the auxiliary aerofoil 73 will be cambered according to the degree of movement from the main rudder 67.

Figure 5:
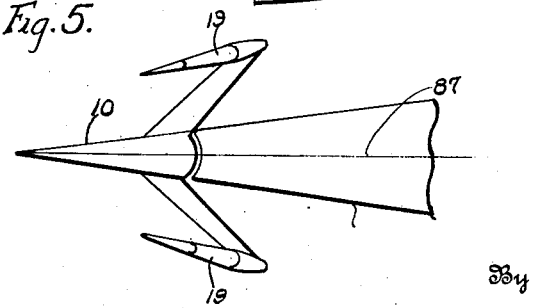
Fig. 5 is an elevational view diagrammatically illustrating auxiliary aerofoils disposed at an inclination to the main rudder aerofoil, the structure being substantially similar to that shown in Fig. 1.

With reference to Fig. 5, I have illustrated diagrammatically an arrangement of rudder aerofoils 10 and 19 substantially the same in construction as that shown in Fig. 1, with the exception that the auxiliary aerofoils 19 in their neutral position are inclined rearwardly toward the longitudinal axis 87 of the fin 13. By providing this inclination of the auxiliary aerofoils the air forces acting thereon tend to steady the rudder mechanism and therefore a relatively more stable structure aerodynamically is provided. It is apparent that the auxiliary aerofoils 52 and 73 illustrated in Figs. 2 and 3, respectively, may be inclined in the same manner as those indicated in Fig. 5.

From the foregoing description, it will be apparent that I have provided a rudder mechanism which is a material improvement over those now in use, and that such apparatus may be applied to marine as well as aircraft rudder mechanisms.

Although I have illustrated but the preferred forms which my invention may assume and have described those forms in detail, it will be apparent to those skilled in the art that it is not so limited but that various minor modifications and changes may be made therein without departing from the spirit of my invention or from the scope of the appended claims.

What I claim is:

1. An aircraft steering mechanism comprising a main aerofoil and a compensating device including a sectional articulated member adapted to be cambered, means connecting the aerofoil and said member, the degree of camber being controlled by movement of the main aerofoil, and adjustable members connected to the aircraft adjacent the main aerofoil and to the articulated member for altering the normal relative positions of the compensating device and the aerofoil.

2. A steering mechanism for aircraft provided with stabilizing fins comprising rudder members secured to the fins, rigid projections extending from the rudder members, relatively movable sectional aerofoils secured to the projections, and means for connecting the aerofoils to the fins, said means controlling movement of the aerofoils with respect to the rudder when the latter is operated.

3. A steering mechanism for aircraft provided with a stabilizing fin, a rudder member secured to the fin, a rigid projection extending from the rudder member, a sectional aerofoil having its sections hinged together and connected to the projection, and means for connecting the aerofoil to the fin to cause the former to assume a cambered contour when the rudder member is operated.

4. The combination with an aircraft fin and rudder member, of a sectional articulated aerofoil connected thereto, adapted to be cambered, the articulated sections being in alignment in the normal position of the rudder member, and means connected to the fin and operative by movement of the rudder to progressively increase the degree of camber of the aerofoil as the rudder member is moved in either direction from its normal position.

5. A steering mechanism for an aircraft provided with a stabilizing fin comprising a rudder member secured to the fin, rigid projections extending from the rudder member, articulated aerofoils adapted to be cambered, each having its articulated portions in alignment, the planes of the aerofoils normally converging toward the plane of the rudder member in the normal position of the latter and means for connecting the aerofoils to the fin and to the projections to control the degree of camber resulting from operation of the rudder member.

6. A control apparatus comprising a positively driven main rudder having a pivotal support, an auxiliary rudder spaced from the main rudder, the surface contour of the auxiliary rudder being variable when it is moved and means pivotally connecting the rudders for actuating the auxiliary rudder only concurrently and in the same direction as the main rudder when the latter is moved.

7. A control apparatus comprising a pivotally supported main rudder, an auxiliary rudder composed of a plurality of sections pivoted together and spaced from the main rudder and connecting means for pivoting the main rudder and all parts of the auxiliary rudder simultaneously in the same direction.

8. A control apparatus comprising a pivotally supported main rudder and a variable auxiliary rudder adapted to be cambered and spaced from the main rudder, means pivotally connecting the rudders and means controlled by movement of the main rudder to vary the camber of the auxiliary rudder, movement of the auxiliary rudder being dependent upon movement of the main rudder, and the rudder being pivotable concurrently only in the same direction.

9. An aircraft steering mechanism comprising a main aerofoil, an auxiliary articulated aerofoil adapted to be cambered and spaced from the main aerofoil, and means connecting the aerofoils, the degree of camber in one direction being effected and controlled by movement of the main aerofoil in the same direction.

10. An aircraft steering mechanism comprising a main aerofoil pivoted adjacent its leading edge to the aircraft, a compensating device including an articulated member adapted to be cambered, the articulated member being disposed entirely in advance of the pivotal connection of the aerofoil, and means connecting the aerofoil and compensating device, the degree of camber being controlled by movement of the main aerofoil.

11. The combination with a lighter-than-air craft provided with a stabilizing fin, of a steering device comprising an articulated aerofoil adapted to be cambered and disposed in spaced relation on each side of the fin, and means connecting each steering device to the fin operative to camber each aerofoil.

12. An aircraft steering device comprising an articulated aerofoil adapted to be cambered, members connecting the aerofoil to the aircraft operative progressively to increase the camber of the aerofoil as it moves from its normal position and means for adjusting a plurality of the members to vary the relative degree of movement of portions of the aerofoil.

13. The combination with an aircraft fin and rudder member, of a sectional aerofoil adapted to be cambered, means operatively connected to the fin and to the aerofoil for progressively increasing the degree of camber as the rudder is operated away from its normal position.

In witness whereof, I have hereunto signed my name.

RICHARD LIEBERT.